No. 637,478. Patented Nov. 21, 1899.
C. E. NICOLS.
CAR FOR TRANSPORTING FRUIT OR VEGETABLES.
(Application filed Jan. 16, 1899.)
(No Model.) 3 Sheets—Sheet 2.
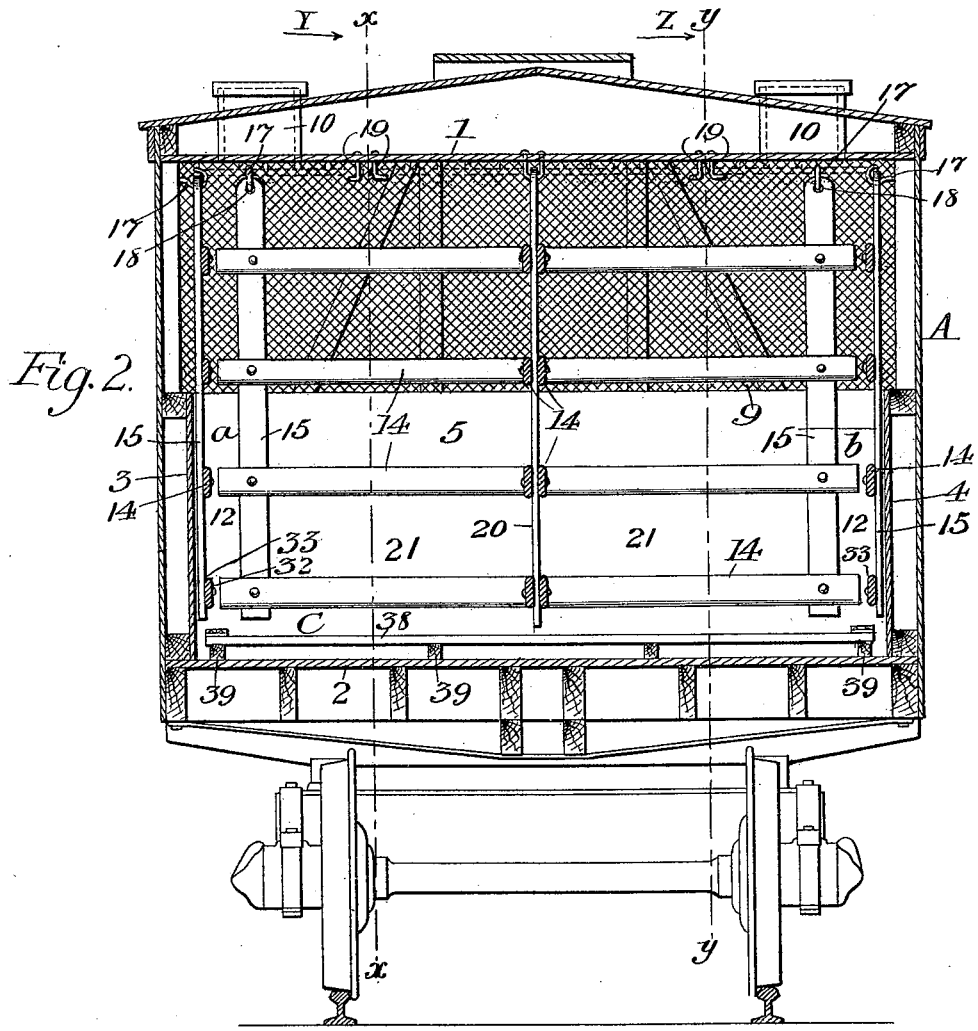
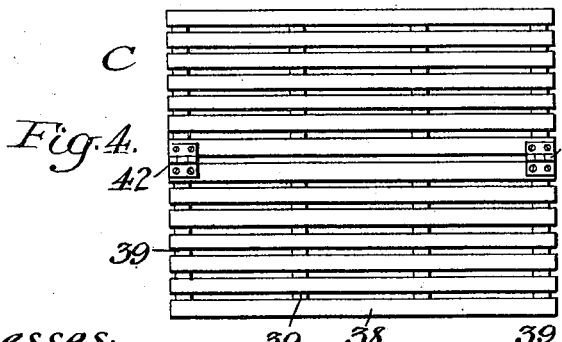
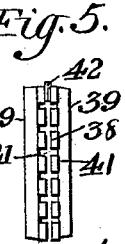
Witnesses:
D. W. Edelin
J. E. Hutchinson Jr.
Inventor:
Charles E. Nicols
by Pennie & Goldsborough
Attorneys No. 637,478. Patented Nov. 21, 1899.
C. E. NICOLS.
CAR FOR TRANSPORTING FRUIT OR VEGETABLES.
(Application filed Jan. 16, 1899.)
(No Model.) 3 Sheets—Sheet 3.
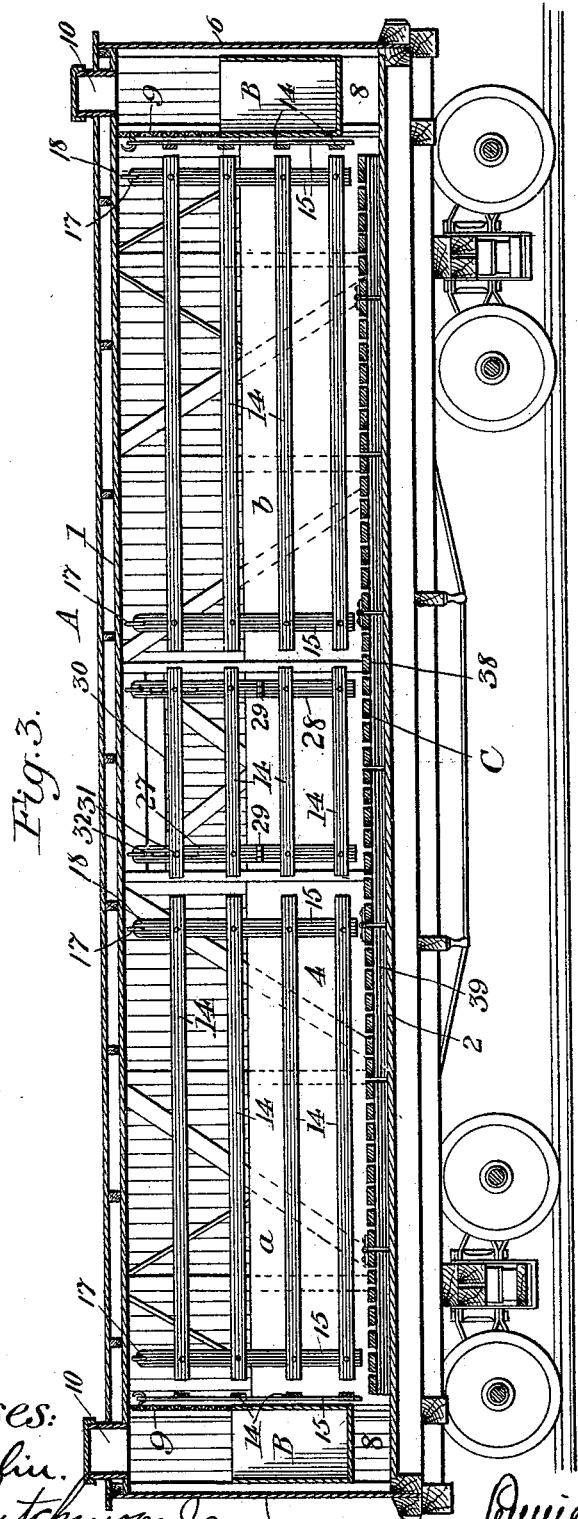
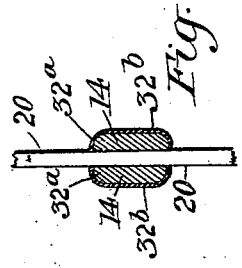
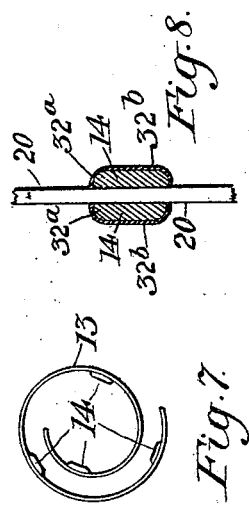
Witnesses:
Inventor:
Charles E. Nicols
By
Attorneys

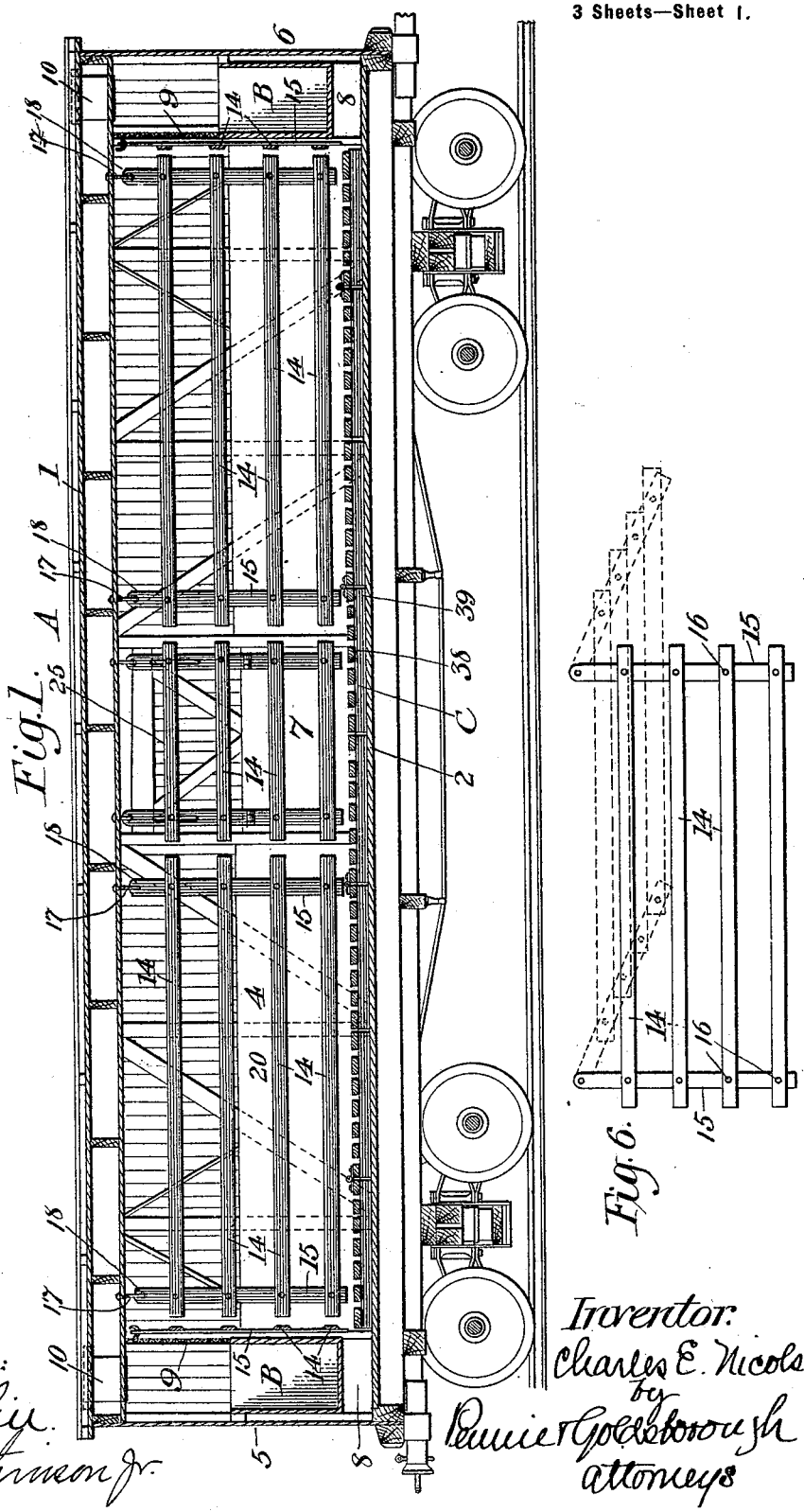

United States Patent Office.

CHARLES E. NICOLS, OF NEW ORLEANS, LOUISIANA.

CAR FOR TRANSPORTING FRUIT OR VEGETABLES.

SPECIFICATION forming part of Letters Patent No. 637,478, dated November 21, 1899.

Application filed January 16, 1899. Serial No. 702,336. (No model.)

*To all whom it may concern:*

Be it known that I, CHARLES E. NICOLS, a citizen of the United States, residing in New Orleans, parish of Orleans, State of Louisiana, have invented certain new and useful Improvements in Cars for Transportation of Fruit or Vegetables; and I do hereby declare the following to be a full, clear, and exact description of the invention, such as will enable others skilled in the art to which it appertains to make and use the same.

This invention relates to freight-cars; and it consists, substantially, in such features of improvement thereof as will hereinafter be more particularly described.

The invention has especial reference to cars for the shipment or transportation of fruit and vegetables and other perishable freight, but is intended more particularly as an improvement in cars for the transportation of bananas and similar fruit in bulk or "in the bunch," as it is termed. When consigning this class of fruit to distant points, it is usual to ship the same while it is yet unripe or in a comparatively green state or condition, and for short distances the fruit is frequently shipped even after it has fully ripened, or nearly so. In the one case it is necessary to guard against the too-rapid ripening of the fruit in transit and in the other to retard as much as possible the process of natural decomposition thereof, which soon begins to take place. It is evident that if such precautions were not taken the cargoes would become a dead loss in many instances. Even with the greatest precautions, however, it very frequently happens that the fruit rapidly decays and is entirely unfit for use by the time its destination is reached. One reason for this is the bad ventilation of the cars in which the shipments are made and another is the unequal and inadequate distribution or circulation of air through and around the fruit-bunches while located in the car. Still another and equally as great a reason is that a large percentage of the fruit is severely bruised by the outer bunches of the rows of fruit constantly striking against the sides or ends of the car, due to the disturbance of the bunches produced by the motion of the car in transit. Of course when a part of the fruit of any one or more bunches begins to decay, whether from a bruise or otherwise, the fruit of the other bunches in the car is more or less tainted by contamination and also begins to decay. In this way alone valuable cargoes have very often been totally destroyed, with considerable loss to the owners.

The principal object of the present invention is to overcome the above-mentioned difficulties or disadvantages and to provide a fruit or vegetable freight-car with means whereby a better or improved ventilation is had, as well as a more perfect and effective air circulation between or throughout the mass constituting the cargo and between or in the spaces separating the mass or bulk from the bottom of the car and from the end and side walls thereof.

A further object is to provide means for preventing the fruit or other cargo from coming into full bodily contact with the side or end walls of the car no matter what the tendency of the cargo is to shift.

The above and additional objects I attain by the means illustrated in the accompanying drawings, in which—

Figure 1 is a longitudinal sectional view of a freight-car having my improvements embodied therein, said view being taken on the line *x x*, Fig. 2, looking in the direction of the arrow marked Y. Fig. 2 is an enlarged transverse sectional view thereof. Fig. 3 is a longitudinal sectional view of Fig. 2 on the line *y y* looking in the direction of the arrow marked Z. Fig. 4 is a detail view in plan of one of the hinged or jointed sections of the grating which constitutes the supplemental floor of the car, and Fig. 5 is also a detail view representing the two parts of said hinged section as folded together. Fig. 6 is a view in detail of one of the sections of the guard or grating which I employ at the sides and center of the car, said view indicating in dotted lines the collapsible nature of the preferred construction of guard or grating. Fig. 7 is a detail view of a modification of the means for joining together the slats which compose the said guard or grating, and Fig. 8 is also a sectional view showing the construction of the guard or grating for partitioning off the interior of the car.

In the carrying out of my invention any well-known form of freight-car is employed without any alteration whatever in the construction thereof, and preliminarily to a more detailed description it may be stated that my invention comprises, as a characteristic feature, a grating or guard that is placed upon the bottom of the car, as well as upon or against the side and end walls thereof within. Sometimes also when desired to separate the interior of the car into compartments for different kinds of freight I employ similar guards as partitions between the compartments. The function of the said grating or guard is practically twofold in that it forms with the bottom and side and end walls an open-air space completely surrounding the cargo of fruit or other feight on all sides, which permits a perfect circulation of air, and, secondly, it prevents the fruit of banana or other bunches from coming into full bodily contact with the sides of the car, which would tend to bruise it and cause it to decay. The said grating or guard could be made a permanent part or fixture of the car; but in order to increase the freight capacity of the car whenever it is desired to use the same for other kinds of freight I prefer to either make the said grating detachable and removable or else collapsible and capable of being turned up against the top of the car and temporarily supported in such position until again required for use.

My invention is capable of different forms or embodiments; but I prefer the construction and arrangement thereof such as I will now proceed to describe.

In the drawings, A represents a freight-car of ordinary construction, the body whereof is constructed with the permanent top 1, bottom 2, side walls 3 and 4, and end walls or sections 5 and 6. On either side of the car, at or near the middle thereof, is a removable door 7 for the purpose of access both in loading and unloading. Also at either end of the car within is a suitable ice-box B for containing ice when refrigeration of any cargo other than bananas is required, and the bottom of each of said boxes is preferably raised or elevated somewhat, so as to leave a space 8 between the same and the floor or bottom 2 of the car. Boxes of this kind are usually provided in freight-cars, and they may be used either for containing ice or for other purpose. Also at each end of the car is an ordinary form of ventilating-pipe 10, leading to the outer air.

As a means for preventing the cargo from coming into contact with the inner surfaces of the side walls of the car either at the time of loading or packing or by accidental shifting due to the motion of the car I provide each of said side walls 3 and 4 with a guard or grating 12, which extends from end to end of the car. Said guard or grating can be constructed in different ways, but is preferably composed of a number of horizontal slats 14, longitudinally arranged and supported at suitable distances from each other by means of the vertical connecting-strips 15, which when the guard is in place rest against the sides of the car, as shown. These guards or gratings are also preferably made up of sections $a\ b$, each of a length approximately the same as the distance to the end of the car from each side of the doors 7 therein. It will be seen that the width of the spaces between the horizontal slats of the grating or guard and the walls of the car is determined by the thickness of the said connecting-strips 15, and these spaces permit of an uninterrupted circulation of air through and around the mass of fruit or other freight constituting the cargo. I also provide similar gratings or guards against the end walls of the car or against the sides of the boxes B C, as shown in Figs. 1, 2, and 3.

I can make the guards as a permanent part of the structure of the car, but as it is frequently desirable to use the car for other purposes and at times when they would prove an obstruction I prefer to make the same either entirely removable or else collapsible and capable of being turned up out of the way and supported or held by suitable means attached to the inner side of the top of the car. The slats 14 could be joined together by flexible strips 13, as shown at Fig. 7, so as to enable the guard to be rolled up; but in the remaining figures I have shown said slats to be pivotally connected at 16 to rigid strips 15, so as to be capable of being collapsed, as shown in dotted lines in Fig. 6. Also as a preferred means of support for the gratings or guards I have herein shown the connecting-strips 15 for the slats as suspended at their upper ends from hooks or other suitable supports 17, secured in the side walls of the car close to the top or roof thereof. The ends of the said strips are simply formed with eyes or openings 18 to enable them to be slipped on and off the hooks as desired, and as a convenient means of storing the guards when not in use I simply swing them upward on their suspending-hooks 17 and then secure them at the top of the car by means of pivoted hooks 19, secured to said top and capable of being turned so as to engage one of the slats of each section of the guard. (See Fig. 2.) By the collapsible nature of the guards they are made to occupy much less space, and the area of surface of the top of the car is sufficient not only to accommodate the different guards or sections thereof at each wall of the car, but also a similar guard or grating 20, (see detail Fig. 8,) which I sometimes employ to divide the interior of the car into two separate longitudinal compartments 21, each of which may be used for different kinds of freight—say boxes or packages in one compartment and bunches of bananas in the other, or both compartments can be filled with the latter. The said guard or grating 20 is also made up of sections, comprising a central section 25, corresponding to the width of the door-openings (see Fig. 1) and capable of being swung to one side while lowered, so as to permit the attendant to pass through in the work of loading or packing the cargo in place, and end sections corresponding to the sections $a$ $b$ of the side guards. This partitioning guard or grating 20 is composed of longitudinal slats secured on both sides of the vertically-connecting strips 15.

Suspended in position before the opening closed by the door 7 are gratings or guard-sections similar in construction to the sections $a$ $b$, except that they are preferably divided horizontally into subsections 27 28, hinged or movably joined together at 29, so as to enable the lower subsection 28 to be folded up against the upper subsection 27 and the whole to be folded up out of the way whenever the door is opened for the purpose of entering the car either for loading or unloading the same. The top slat 30 of said sections is movable or adjustable up and down by means of pins 31 at the ends thereof working in slots 32, formed in each of the vertical supporting-strips for the sections. The purpose of said movable or adjustable slats is to enable the attendant or packer while standing on the outside of the car to reach in and properly place the last bunches of the cargo in position. After this is done the slats are moved to occupy such position as to prevent these bunches from striking against the door, which is finally closed and secured in the ordinary way. The central section of the partitioning-guard 20 is also provided with a similar movable or adjustable top slat.

As a means of preventing the bruising of bananas and similar fruit by bodily contact with the walls of the car, I arrange the slats of said guards at such distances apart that no appreciable extent of surface of the fruit can at any time project through between the same, and in this way the bruising of the fruit will be almost entirely prevented. To guard still further against bruising the fruit, I round off the edges of the slats 14, as shown at $32^a$, Fig. 8, for instance, so as not to present sharp corners or angles which would tend to scrape or abrade the skin of the fruit or cut into the pulp thereof. As a still further precaution against rupturing or bruising the fruit I sometimes pad the slats 14 or else cover the same with india-rubber or other soft or elastic material $32^b$, as shown in Fig. 8. From the means described it will be seen that I have effectively provided for the free ventilation and circulation of air throughout the car and also for the secure protection of the fruit against injury in transit. As a means also of providing for the free circulation of air at the bottom 2 of the car and beneath the banana-bunches or other freight, I provide the said bottom with a supplemental bottom or flooring C, which is formed of slats 38, which are united or held in position by means of connecting-strips 39, which rest on the main bottom or floor 2. I make said supplemental slatted flooring of a number of separate sections 40, each comprising two or more subsections 41, hinged or otherwise joined together at 42, so as to be capable of being folded, as shown in Fig. 5. When desired to increase the interior capacity of the car for other purposes, the said supplemental flooring can be readily folded up and packed away at the ends of the car. It is thought the advantages of my invention, as well as the preferred construction and arrangement of parts constituting the same, will be fully understood without further description.

What I claim is—

1. In a fruit or vegetable freight-car, the combination with the end and side walls thereof, of movably-suspended collapsible guards or gratings, the same forming air-spaces with the walls, and preventing contact of the freight or cargo with the walls, and means on the guards preventing abrasion of the cargo, said guards or gratings, when in position, being stationary or immovable with respect to said walls.

2. A fruit or vegetable freight-car, the inner walls of which are provided with guards or gratings formed in sections of collapsible slatwork pivotally suspended at their upper ends and adapted to be swung upward against the top of the car, and means in the upper part of the car for engaging and holding the same in such elevated position.

3. A fruit or vegetable freight-car, the inner walls of which are provided with detachable sectional guards or gratings to form air-spaces and prevent the cargo from coming into contact with said walls, said car being also provided with detachable sectional slatted floor-sections.

4. A fruit or vegetable freight-car, the inner side walls of which are provided with guards or gratings, said side guards or gratings having a door-section adapted to be swung out of the way.

5. A fruit or vegetable freight-car, the inner side walls of which are provided with guards or gratings, said side guards or gratings having a door-section provided with a vertically-adjustable top slat.

6. A fruit or vegetable freight-car, the inner side walls of which are provided with guards or gratings, said side guards or gratings having a door-section, the lower part of which is horizontally hinged so as to be turned up.

7. In a fruit or vegetable freight-car, the combination of slatted side guards or gratings, comprising the sections $a$, $b$, and intermediate door-sections, guards or gratings at the ends of the car, and floor guards or gratings, said side and end guards or gratings consisting of horizontal slats 14 pivotally secured to vertical slats 15, and said floor guards or gratings consisting of the slatted sections hinged together, the side and end guards or gratings being collapsible as described and suspended at their upper ends, and the floor guards or gratings being removable, the car being provided with pivoted hooks 19 in the ceiling whereby the side and end guards or gratings may be secured in folded condition out of the way.

In testimony whereof I affix my signature in presence of two witnesses.

CHARLES E. NICOLS.

Witnesses:
  A. E. BLACKMAR,
  MAX HUBERT.